Dec. 2, 1969     D. SILVERMAN     3,481,426

SEISMIC WAVE SOURCE FOR MARINE PROSPECTING

Filed June 4, 1968     2 Sheets-Sheet 1

DANIEL SILVERMAN
INVENTOR.

BY *Newell Pottorf*
ATTORNEY

DANIEL SILVERMAN
INVENTOR.

BY Newell Pottorf
ATTORNEY

United States Patent Office 3,481,426
Patented Dec. 2, 1969

3,481,426
SEISMIC WAVE SOURCE FOR MARINE
PROSPECTING
Daniel Silverman, Tulsa, Okla., assignor to Pan American Petroleum Corporation, Tulsa, Okla., a corporation of Delaware
Filed June 4, 1968, Ser. No. 734,288
Int. Cl. G01v 1/38
U.S. Cl. 181—.5　　　　　　　　　　　　　11 Claims

ABSTRACT OF THE DISCLOSURE

A seismic-wave source for prospecting in water-covered areas diverts a high-velocity water stream flowing in a first conduit alternately between a second and a third conduit having their respective outlets spaced a half water wave-length apart in the direction of desired wave transmission, to produce a train of pressure pulses in the water forming a constant- or a variable-frequency signal. Alternatively, the third conduit may open into a compliant energy-storage chamber, preferably tuned to the desired signal frequency.

BACKGROUND OF THE INVENTION

Field of the invention

This invention relates to seismic prospecting in water-covered areas. More specifically, it is directed to apparatus for creating in the water acoustical or seismic signals of constant or variable frequency suitable for use in seismic exploration operations.

Description of the prior art

In the prior art, the most common types of seismic-wave source used to generate constant or variable-frequency signals many cycles in length are electrically or hydraulically driven pistons, the faces of which push on the water. For very high-power sources, electro-hydraulic systems are generally used in which electrical signals control a pilot valve which then controls the flow of high-pressure liquid to push alternately on opposite sides of a piston, which is connected to a pressure plate in contact with the surrounding water medium. One major difficulty with such systems, in which a pressure plate or piston alternately pushes and "pulls" on the water, is the effect of cavitation that occurs at the piston face. The cavitation is due to the fact that the piston face moves away from the water faster than the water can follow, and thus bubbles of vapor form and subsequently collapse against the piston causing spurious noise signals, as well as severe erosion of the piston face.

SUMMARY OF THE INVENTION

In the system of the present invention, the flowing hydraulic liquid, instead of acting on a piston system, acts directly on the surrounding water medium, and moves only in one direction. Thus, the hydraulic liquid pushes directly on the water, so there is no "pulling" and therefore no opportunity for cavitation to occur. Also, since there is no effect of inertia of large, moving mechanical parts, the wave-generating system of this invention makes possible higher frequencies of signal generation at high power than do the prior-art systems.

In this signal-generating system, a motor-driven pump sets up a high-velocity stream of water in a first conduit. This high-velocity stream is alternately diverted between two other conduits, the outlets of which discharge into the main body of water. To distinguish between the water flowing at high velocity for signal generation and the main body of water which is the signal-transmission medium, the latter will be designated the signal-transmission medium or simply the medium. The outlets of the second and third conduits are separated by a distance D equal to one-half wave length of the signal in the medium, forming a dipole. In the direction of alignment of the two outlets, the two sets of pulses add in phase creating a signal of twice the energy for a single outlet. In directions at right angles to this alignment direction, the two sets of pulses combine with opposite phase to form a continuous flow or no signal.

In normal seismic reflection prospecting use, the line of directivity would preferably be vertical. Signals would then be sent vertically downward and simultaneously vertically upward. In addition, by placing the two outlets at a proper distance below the surface of the medium, the downward reflection of the up-traveling energy at the surface of the medium (the echo or "ghost" reflection) will be in phase with the down-traveling signal, again doubling the energy of the down-traveling signal.

In an alternate embodiment of the invention, the third conduit discharges liquid into a closed chamber having a flexible diaphragm which seals off a volume of air under pressure. Accordingly, pulses of water flow that would have been discharged from the third conduit into the surrounding medium go into and are stored in the chamber to be delivered during the next half cycle when the high-velocity flow is again diverted to the outlet of the second conduit. Accordingly, the flow through the second conduit includes both that in the first as well as the flow out of the pressure chamber. By proper choice of dimensions of the conduits and chamber and of the air pressure in the chamber, an approximate tuning can be provided to achieve optimum operation at any desired frequency. As compared with the two-outlet directional system described above, this signal-generating system would be omni-directional.

It may accordingly be considered a principal objective of this invention to provide a signal-generating system for seismic operations in water-covered areas that is free of the limitations of the prior-art systems in frequency, power output, and cavitation, but can be made directional or omni-directional, and that has both high power and high frequency capabilities.

BRIEF DESCRIPTION OF THE DRAWINGS

The principles of this invention and the details of the preferred and other embodiments and objectives will be better understood from the following description taken in conjunction with the attached ddawings forming a part of this application, in which drawings.

DESCRIPTION OF THE PREFERRED EMBODIMENTS

Figure 1:
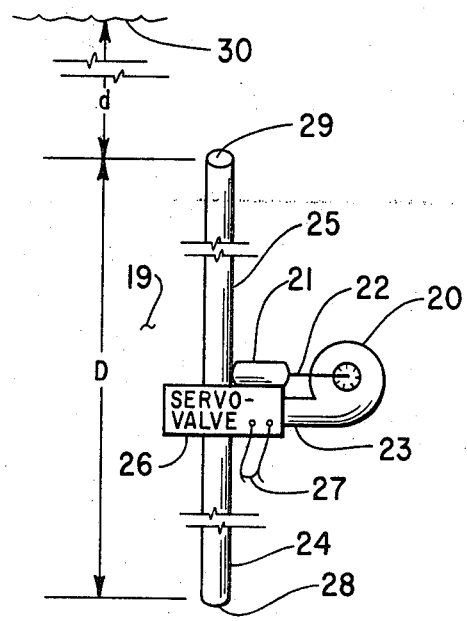
FIGURE 1 is a schematic representation of a preferred embodiment for generating hydraulic pulse outputs alternately from two vertically spaced outlets.

Referring now to the drawings, I show diagrammatically in FIGURE 1 a preferred embodiment of this invention in its operating environment. Immersed in a body of water 19 with surface 30 is a hydraulic pump 20 driven by a motor 21 through a drive means 22. Pump 20 takes in water continuously from body 19 and forces it at high velocity through a pipe 23 into a valve means 26. Valve means 26, shown schematically, includes an electrically controlled pilot valve controlling a master spool valve. Both of these devices are well known in the art and are readily available from commercial suppliers, such as Moog Inc., P.O. Box 8, East Aurora, N.Y. 14052. The master valve of means 26 transfers the high-velocity flow of water from pipe 23 alternately into two pipes or conduits 24 and 25 which terminate at the respective open ends 28 and 29 discharging the flow into the surrounding water medium 19. Preferably, the two pipes 24 and 25 are approximately equal in length and flow resistance. The spacing D between the two discharge points 28 and 29 is preferably one-half wave length of the acoustic or seismic signal in water medium 19. Thus, if the frequency of water-flow pulses out of one end 28, for example, is $f$ pulses per second, and V is the velocity of sound in medium 19, then $D=V/2f$. Since the flow pulse from each outlet end 28 or 29 creates a spherical wave of positive pressure, the wavefront starting, say, at 29 reaches the outlet 28 in one-half of the wave period. By this time, the flow pulse is starting again from outlet 28, so the two positive pressure pulses reinforce each other as they progress downward through medium 19. The same action takes place in the reverse direction, so an up-traveling wavefront progresses toward the water surface 30, where it is reflected with reversed phase and redirected downwardly. As a positive pressure pulse reflected at surface 30 thus becomes a down-going negative pressure pulse, in order for it not to interfere with the positive pressure pulses emitted at ports 29 and 28, it should pass ends 28 and 29 midway between the times of emission of the positive pressure pulses. This occurs if the distance $d$ is an odd multiple of one-quarter wavelength of the acoustic signal in medium 19, or $d=nV/4f$ where $n$ is an odd positive integer (1, 3, 5, etc.).

For a constant-frequency signal, the distances $d$ and D would be constant. If the desired signal is one of varying frequency, it becomes desirable to change the length D, and preferably also $d$ to suit the changing frequency. This can be accomplished in any one of a number of ways, some of which are illustrated schematically in FIGURES 2, 3, 4 and 5.

Figure 2:
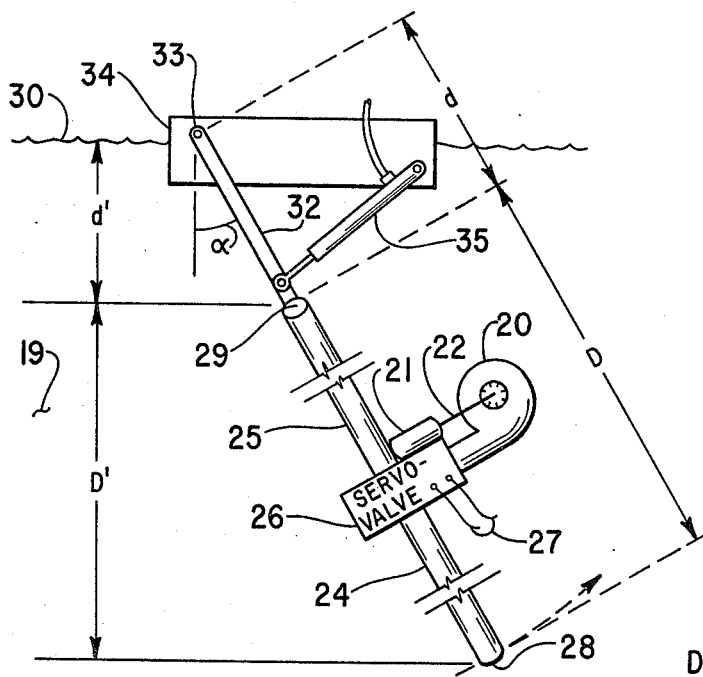

In FIGURE 2 is shown diagrammatically the mechanism of FIGURE 1 attached to an arm 32 rotatable about a pivot 33 supported by a float 34 at water surface 30. Arm 32, aligned with outlets 28 and 29, is positioned by a hydraulic cylinder and piston mechanism 35 at an angle $\alpha$ with respect to the vertical direction of desired wave propagation, such that $D'=D \cos \alpha$ and $d'=d \cos \alpha$, where D' and d' are respectively one-half and one-quarter wavelengths in water of the desired seismic waves, which are of a constant frequency higher than a low limiting frequency for which D and $d$ are the half and quarter wavelengths. In ordinary seismic-surveying operations, the horizontal components of the spacings D and $d$ can be neglected, the vertical components being the critical ones for wave reinforcement in the vertical direction of wave propagation. This embodiment has the additional advantage that, to change the frequency of waves being emitted and reinforced for vertical propagation, only the angle $\alpha$ need be changed, either by a fixed amount or by a continuously varying amount to readjust both d' and D' to new fixed values or to appropriately varying values according to a frequency sweep wherein the frequency varies as some continuous function of time.

Figure 3:
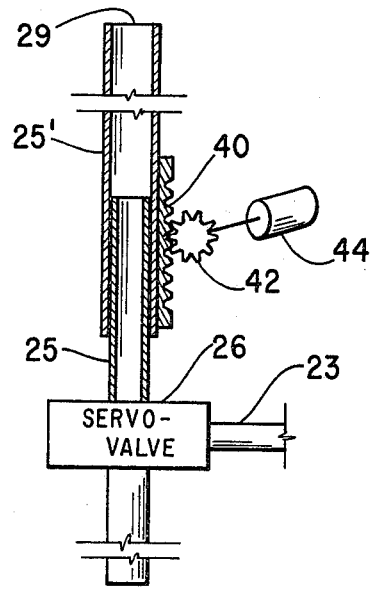
FIGURES 2, 3, 4 and 5 show schematically different ways of changing the vertical spacing of the outlets of FIGURE 1.

An alternative mode of varying the effective output frequency of the source is shown in FIGURE 3 in which the effective length of the conduit 25, for example, is varied by a telescoping section 25' adjustable lengthwise by means such as a rack 40, engaged by a pinion 42, driven by an auxiliary motor 44. Corresponding mechanism for varying the length of the pipe 24 and appropriately varying the length of support arm 32 to vary the submergence depth $d$ will be obvious from this figure.

Figure 4:
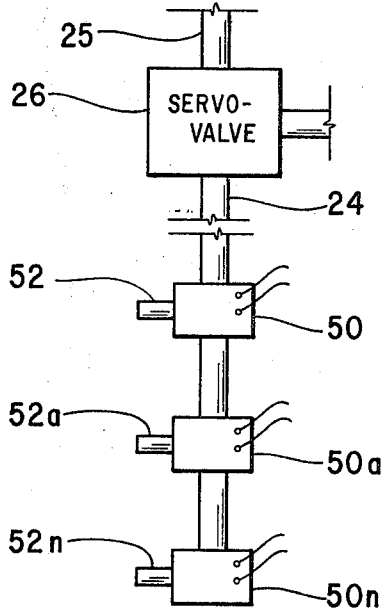
Figure 5:
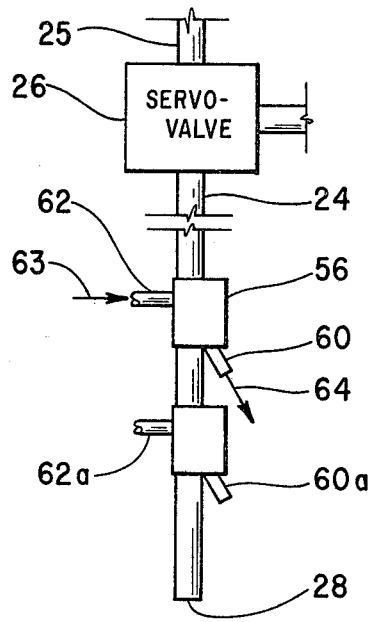

In FIGURES 4 and 5 are shown conduits or pipes of fixed length provided with a plurality of outlets spaced along the pipes. Thus, as is shown in FIGURE 4, valves 50, 50a–50n control which of the outlets 52, 52a–52n is the effective opening of the pipe 24, the pipe 25 being provided with correspondingly spaced electrically operated valved outlets. As will be apparent, valves 50–50n and the corresponding valves on pipe 25 can be selectively operated according to a predetermined program, not only to vary the over-all spacing D between the particular valve ports which are open at any instant, but by choice of the particular valves opened, the effective depth of submergence $d$ of the uppermost opening 29 of pipe 25 can also be changed in a stepwise manner. It will be understood that when any intermediate valve, such as 52a, is opened for emitting pulses of water flow, all other outlets, such as 52, and particularly 52n at the bottom end of pipe 24, will be closed.

In the embodiment of FIGURE 5, the electrically operated valves 50, 50a–50n are replaced by corresponding fluidic controls. Such fluidic control units are well known in the hydraulic-amplifier art and are described in several texts, such as Fluidics, published in 1965 by Fluid Amplifier Associates, Inc., P.O. Box 355, Kenmore Station, Boston, Mass. 02215. The typical fluidic control unit 56 includes segments of the pipe 24 as inlet and outlet for straight-through fluid flow, and is provided with a second or side outlet pipe 60 and a control inlet pipe 62 entering unit 56 on the side opposite to side outlet pipe 60. In operation, fluid entering the top of unit 56 will flow straight through to its bottom outlet, there being no flow out of side port 60. However, where a pilot flow of liquid 63 enters control inlet 62, the entire fluid stream is switched to side outlet 60 as the flow 64. Thus by appropriately controlling the flow of pilot streams into control inlets 62, 62a, etc., the main high-velocity flow stream can be rapidly switched from one outlet pipe 60 to another 60a, etc. This switching of the high-velocity flow between outlets 52–52n in FIGURE 4 and 60, 62a, etc., in FIGURE 5 is for the purpose of changing the effective length of the spacing D between the upper and lower outlets of the system, or additionally varying the depth $d$ of the upper outlet below water surface 30, and is in addition to the high-frequency alternation of the flow between lower outlet 28 and upper outlet 29 by the hydraulic servo-valve 26 energized by the electrical signals present on leads 27.

Figure 6:
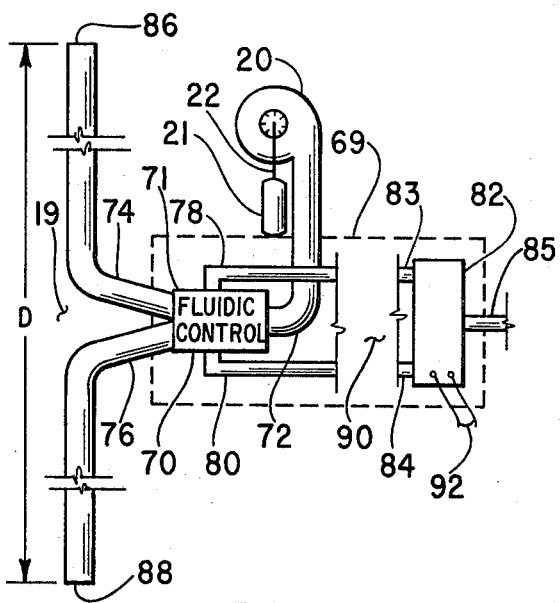
FIGURE 6 shows schematically a modification of the system of FIGURE 1 to use a fluidic control for transferring fluid flow alternately to the two outlets.

In FIGURE 6 is shown a modification of the system of FIGURE 1 in which a fluidic control system 69 of the character shown in FIGURE 5 is adapted to the function of the servo-controlled electro-hydraulic valve 26. The fluidic control unit 71 comprises a body 70 having a main inlet opening 72 to which is connected conduit 23 from pump 20 through which is delivered the high-velocity fluid-flow stream. At the other end of unit 71 are output pipes 74 and 76 placed symmetrically at an angle with respect to the inlet 72 so as to tend to divide the flow from inlet 72 evenly. On either side of unit 71 are control inlet pipes 78 and 80. When control fluid enters inlet 78, for example, it causes the entire flow from inlet 72 to pass through outlet 76. Conversely, when control fluid enters inlet 80, the entire output is transferred to pipe 74. Thus, by means of the minor liquid flow streams in control pipes 78 and 80, the major flow entering through inlet 72 can be transferred alternately to the two outlets 74 and 76 leading to end outlets 86 and 88 in medium 19. As in FIGURE 1, the spacing of the outlets 86 and 88 is preferably D.

As is suggested schematically in system 69, there may be one or more additional fluidic amplifier units 90 between an electro-hydraulic valve 82 and the final fluidic control unit 71. Thus, a very small amount of hydraulic fluid input at inlet 85 of valve 82 can be controllably delivered to outlets 83 and 84 as inlet controls for the fluidic units 90 supplying the final fluid controls through inlets 78 and 80 to the unit 71. As compared with the servo-controlled electro-hydraulic valve 26, the electro-hydraulic valve 82 may be quite small and compact, besides having the capability of higher frequency response and requiring less electrical power for control than is true of the more massive unit 26, which is required to control the full power output of the seismic source. Thus, electrical signals of relatively small power applied at control inlet 92 accurately control the pulses of hydraulic current flow out of openings 86 and 88, with the switching of flow between outlet 86 and outlet 88 being done more rapidly than can ordinarily be done with valves employing physically moving members. Thus, operation at quite high frequencies is feasible with the system of FIGURE 6.

Figure 7:
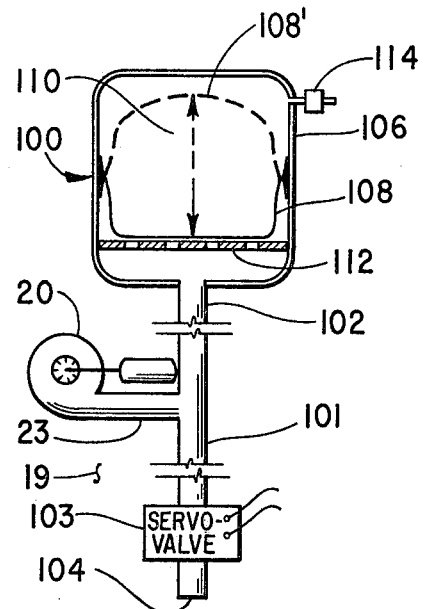
FIGURE 7 is a further embodiment of this invention utilizing a single fluid outlet and an energy storage chamber.

In FIGURE 7 is shown an alternative embodiment of the invention in which one of the two discharge pipes is replaced with a compliant energy storage means. Thus, the pipe 23 carrying the high-velocity liquid flow produced by pump 20 connects to a pair of conduits 101 and 102, flow from open end 104 of pipe 101 being turned on and off by the electro-hydraulic servo-valve 103. During the half cycles of signal generation when flow at opening 104 is cut off by valve 103, the flow is diverted through pipe 102 into the energy storage means 100. This comprises a sealed high pressure container 106 containing an upper space 110 filled with air or gas at a predetermined pressure, which space is separated from the lower portion of the chamber by a flexible diaphragm 108 supported by a perforated plate 112 which acts as a stop-wall for the diaphram. Accordingly, when flow through outlet 104 is cut off by valve 103, the continuous liquid flow in conduit 23 is diverted through pipe 102 into the lower portion of vessel 106 against the pressure of air in space 110 forcing the diaphragm upward to a position such as 108' and compressing still further the air in space 110. Then, when valve 103 opens to pass the next pulse of liquid through opening 104, the flow of liquid in conduit 23 and pipe 101 is augmented by additional flow through pipe 102 from the space below the diaphragm 108 under pressure of the air in space 110 acting against diaphragm 108. This results in a higher volume of flow through opening 104 than the instantaneous value of flow in conduit 23. By choice of the size of chamber 106, the pressure of the air or gas in space 110, and the lengths and cross-sections of pipes 101 and 102, the period of the natural oscillation of liquid flow into and out of accumulator 100 can be adjusted to be the same as the desired frequency of flow pulses emerging from outlet 104.

The detailed designs of such an oscillating system are not important in the present invention and so will not be discussed further. The principles of such design are, however, well known, and the design constants can be determined either analytically or empirically to provide a working system. As compared with the system of FIGURE 1, which is essentially a dipole, that of FIGURE 7 is essentially a point source and is thus omni-directional, except as it may be located in medium 19 at a depth below surface 30 at a distance $d$ such as to get downward reinforcement of the pulses generated at outlet 104. As with the previous embodiments, the optimum value for the distance $d$ would be an odd multiple of one-quarter wavelength of the signals being generated, thus allowing for phase inversion at surface 30 of the emitted impulses by timing them so as to occur midway between successive positive pressure impulses emitted at opening 104.

While I have shown and described a number of different embodiments of the invention, still others may occur to those skilled in the art utilizing the same principles of operation as the embodiments described in detail. Accordingly, therefore, the invention should not be considered as limited to the details described, but its scope is properly to be ascertained from the appended claims.

I claim:

1. The method of generating seismic waves in a water medium which comprises the steps of
    producing a high-velocity continuous flow of water through a first conduit below the water surface,
    at the frequency of the desired seismic waves, alternately diverting said flow between a second conduit opening into said medium and a third conduit, and
    discharging the flow diverted to said third conduit into said medium at a distance D from the opening of said second conduit in the direction of desired seismic wave propagation, D being about a half wavelength of said desired seismic waves in said medium.

2. The method of generating seismic waves in a water medium which comprises the steps of
    producing a high-velocity continuous flow of water through a first conduit below the water surface,
    at the frequency of the desired seismic waves, alternately diverting said flow between a second conduit opening into said medium and a third conduit,
    storing under pressure the water flowing in said third conduit while said flow is diverted thereto, and
    adding said stored water to that flowing in said second conduit and thence into said medium while said flow is diverted to said second circuit.

3. The method of claim 1 in which D is the vertical distance between the openings of said second and said third conduits into said medium and including the further step of
    positioning the upper of said conduit openings at a depth $nd$ below the surface of said medium, where $n$ is an odd integer and $d$ is a distance equal to about a quarter wavelength of said desired seismic waves in said medium.

4. The method of claim 2 including the further step of
    positioning said opening of said second conduit into said medium at a depth $nd$ below the surface of said medium where $n$ is an odd integer and $d$ is a distance equal to about a quarter wavelength of said desired seismic waves in said medium.

5. For generating continuous seismic waves in water in response to an alternating electrical control signal, apparatus comprising
    a first conduit having inlet and outlet ends,
    means for producing a continuous, high-velocity flow of water through said first conduit,
    a second conduit and a third conduit each having an inlet and at least one outlet, and
    means responsive to said electrical control signal to divert water from the outlet of said first conduit alternately to the inlets of said second and third conduits at the frequency of the desired seismic waves,
    the spacing of the outlets of said second and third conduits, relative to the direction of propagation of said desired seismic waves, having a value D about equal to a half wavelength of said desired seismic waves in water.

6. Apparatus as in claim 5 including means to vary said outlet spacing D to maintain it, relative to said direction of propagation, about equal to a half wavelength of said desired seismic waves, when said waves change frequency.

7. Apparatus as in claim 6 in which spacing-varying means comprises means to rotate said second and third conduits about an axis perpendicular to said direction of propagation.

8. Apparatus as in claim 6 including telescoping means to vary the length of at least one of said second and third conduits between its inlet and its outlet.

9. Apparatus as in claim 6 in which at least one of said second and third conduits has a plurality of outlets spaced at intervals along its length, and closure means for maintaining said outlets normally closed, said spacing-varying means comprising means to selectively open said closure means.

10. Apparatus as in claim 9 in which said closure means are servo valves.

11. Apparatus as in claim 9 in which said closure means are fluid amplifier units.

References Cited

UNITED STATES PATENTS 3,083,664  4/1963  Burrell _____ 340—12

RICHARD A. FARLEY, Primary Examiner

CHARLES E. WANDS, Assistant Examiner

U.S. Cl. X.R.

340—12